United States Patent
Hur et al.

(10) Patent No.: US 7,525,999 B2
(45) Date of Patent: Apr. 28, 2009

(54) METHOD AND APPARATUS FOR PROVIDING DUAL VARIABLE CLOCKS FOR LOW-POWER WIRELESS PACKET COMMUNICATION

(75) Inventors: Jeen Hur, Kyunggi-do (KR); Sun Hee Kim, Seoul (KR); Byung Jo Kim, Daejeon (KR); Seong Su Park, Daejeon (KR); Sang Baek Han, Daejeon (KR); Hoo Sung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 619 days.

(21) Appl. No.: 11/299,203

(22) Filed: Dec. 9, 2005

(65) Prior Publication Data

US 2006/0203741 A1    Sep. 14, 2006

(30) Foreign Application Priority Data

Dec. 10, 2004   (KR)   ............... 10-2004-0104334
Jul. 14, 2005    (KR)   ............... 10-2005-0063909

(51) Int. Cl.
*H04J 3/06*    (2006.01)
(52) U.S. Cl. .................. 370/503; 370/252
(58) Field of Classification Search ........ 370/252, 370/311, 328, 338, 350, 503
See application file for complete search history.

(56) References Cited

U.S. PATENT DOCUMENTS 6,564,329 B1    5/2003   Cheung et al.
7,321,755 B2*   1/2008   Hulvey ............... 455/343.1
2004/0125766 A1*  7/2004  Takano et al. ........ 370/328

FOREIGN PATENT DOCUMENTS

KR    2003-0026741    4/2003

(Continued)

OTHER PUBLICATIONS

"Battery-Efficient Architecture for an 802.11 MAC Processor" Kanishka Lahiri, et al.; *Proceedings of 2002 IEEE International Conference on Communications—IC 2002*, 2002, pp. 669-674.

(Continued)

*Primary Examiner*—Ricky Ngo
*Assistant Examiner*—Christine Ng
(74) *Attorney, Agent, or Firm*—Blakely, Sokoloff, Taylor & Zafman LLP

(57) ABSTRACT

Provided is a wireless packet communication method, and more particularly, a method and apparatus for enabling low-power communication by providing separate driving clocks optimized for a lower part for performing the function of a physical layer part and an upper part for performing the function of an upper layer above the physical layer in a wireless packet communication system. The method includes a first clock providing step of measuring actual data transmission and reception rates at a predetermined period, setting up a frequency ($F_1$) of a first clock based on the measured rates, and providing the first clock to the upper part and a second clock providing step of determining a transfer mode of the wireless packet communication system, detecting a frequency ($F_2$) of a second clock selected according to the determined transfer mode, and providing the second clock to the lower part.

10 Claims, 1 Drawing Sheet

FOREIGN PATENT DOCUMENTS

| | | |
|---|---|---|
| KR | 1020040076678 A | 9/2004 |
| WO | WO 00/38038 A1 | 6/2000 |
| WO | WO 02/09351 A2 | 1/2002 |

OTHER PUBLICATIONS

"A Single-Chip 802.11a MAC/PHY With a 32-b RISC Processor" Toshio Fujisawa, et al.; *IEEE Journal of Solid-State Circuits*, vol. 38, No. 11, pp. 2001-2009 Nov. 2003.

"A Single-Chip 802.11a MAC/PHY with a 32b RISC Processor," by Toshio Fujisawa et al.; *2003 IEEE International Solid-State Circuits Conference*; ISSCC 2003 / Session 8 / Communications Signal Processing / Paper 8.2.

"Battery-Efficient Architecture for an 802.11 MAC Processor," by Kanishka Lahiri et al.; *2002 IEEE*; pp. 669-674.

\* cited by examiner

METHOD AND APPARATUS FOR PROVIDING DUAL VARIABLE CLOCKS FOR LOW-POWER WIRELESS PACKET COMMUNICATION

CROSS-REFERENCE TO RELATED APPLICATION

This application claims priority to and the benefit of Korean Patent Application Nos. 2004-104334 filed on Dec. 10, 2004 and 2005-63909 filed on Jul. 14, 2005, the disclosures of which are incorporated herein by reference in its entirety.

BACKGROUND

1. Field of the Invention

The present invention relates generally to wireless packet communication, and more particularly, to a method and apparatus for enabling low-power communication by providing dual variable clocks optimized for physical layer execution parts and upper layer execution parts, respectively, in a wireless packet communication system.

2. Discussion of Related Art

Most of the electric power consumed in a CMOS (Complimentary Metal Oxide Silicon) digital circuit is consumed by charging/discharging of a load capacitor. Here, since the electric power consumption is in linear proportion to a driving clock frequency, the driving clock frequency is preferably optimized in order to reduce the electric power consumption. In this regard, there is an optimal driving voltage for an optimal driving clock frequency. Thus, low-power processors capable of varying driving voltage and frequency, such as Crusoe of Transmeta, 405LP of IBM, XScale and newest Mobile Pentium of Intel etc., have been released onto the market.

Conventional art related to the present invention includes technology related to ASICs (Application-specific integrated circuits) including a clock control capable of dynamically varying frequency according to a data throughput of a mobile device (U.S. Pat. No. 6,564,329 B1), technology related to a control system for varying a CPU clock speed according to a processing request of a device when a predetermined application program is executed or a predetermined interrupt is serviced (Korean Patent Publication No. 2001-099880), technology related to a method for controlling a CPU clock speed designed to reduce electric power consumption by varying the CPU clock speed according to an operational mode of a system operating system (Korean Patent Publication No. 2004-076678), research related to a MAC (Media Access Control) layer processing structure and a bus structure which are capable of performing power management making the most of battery characteristics (Communications, 2002, ICC 2002, IEE International Conference on Volume: 2 pp. 669-674, vol. 2), and research related to accomplishing lower power consumption (Solid-State Circuits, IEE Journal of Volume: 38, PP. 2001-2009).

Wireless packet communication devices based on wireless access protocol standards such as Bluetooth (IEEE 802.15.1), WLAN (IEEE 802.11a/b/g), WiMAX (IEEE 802.16d/e), etc. support multiple transfer modes (e.g. in the case of an IEEE 802.11g based system, eight transfer modes of 6, 9, 12, 18, 24, 36, 48 and 54 Mbps) and packet retransmission function.

In general, a wireless packet communication device supporting the multiple transfer modes parses a header of a received packet, thereby operating in any one of a plurality of transfer modes defined in a protocol prescribed in each standard, wherein the operated transfer mode is suitable for a radio environment. For example, when the radio environment deteriorates, the wireless communication device switches into a low transmission rate transfer mode and operates in a low transmission rate. In this case, a clock frequency provided to guarantee a high transmission rate is inefficient for the low transmission rate transfer mode in terms of electric power consumption.

Meanwhile, when the other party does not receive a previously transmitted packet, the wireless communication device retransmits the missing packet. Here, an actual data transmission rate can be lower than a predicted data transmission rate in the transfer mode. For example, if an IEEE 802.11g based wireless communication device, which can support the eight transfer modes of 6, 9, 12, 18, 24, 36, 48 and 54 Mbps, operates in the 18 Mbps transfer mode, the actual transmission rate is 13 Mbps. In this case, the driving clock frequency optimal for the transfer mode of 18 Mbps is used and thus electric power is unnecessarily consumed.

SUMMARY OF THE INVENTION

It is an objective of the present invention to provide a method and apparatus for providing dual variable clocks, in which variable clocks optimized for a transfer mode and an actual data transmission rate, respectively, are provided for the purpose of low-power driving of a wireless packet communication system.

It is another objective of the present invention to provide a method and apparatus for providing dual variable clocks, in which, for the purpose of low-power driving of a wireless packet communication system, one variable clock optimized for a transfer mode is provided for the parts for executing the functions of a physical layer and the other variable clock optimized for an actual data transmission rate is provided for the parts for executing the functions of a upper layer.

One aspect of the present invention provides a method for providing dual variable clocks in a wireless packet communication system, in which the wireless packet communication system is logically divided into a lower part for performing the function of a physical layer and an upper part for performing the function of an upper layer above the physical layer. The method comprises the steps of (a) measuring actual data transmission and reception rates at a predetermined period, setting up a frequency ($F_1$) of a first clock based on the measured rates, and providing the first clock to the upper part; and (b) determining a transfer mode of the wireless packet communication system, detecting a frequency ($F_2$) of a second clock selected according to the determined transfer mode, and providing the second clock to the lower part.

Another aspect of the present invention provides an apparatus for providing dual variable clocks in a wireless packet communication system, in which the wireless packet communication system is logically divided into a lower part for performing the function of a physical layer and an upper part for performing the function of an upper layer above the physical layer. The apparatus comprises a first clock providing means for measuring actual data transmission and reception rates at a predetermined period, setting up a frequency ($F_1$) of a first clock based on the measured rates, and providing the first clock to the upper part; and a second clock providing means for determining a transfer mode of the wireless packet communication system, detecting a frequency ($F_2$) of a second clock selected according to the determined transfer mode, and providing the second clock to the lower part.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 1 is a block diagram of a wireless packet communication system, which an apparatus for providing dual variable clocks in accordance with the present invention may be applied to.

DETAILED DESCRIPTION OF EXEMPLARY EMBODIMENTS

Hereinafter, an exemplary embodiment of the present invention will be described in detail. However, the follow detailed description is merely exemplary in nature, and should not be construed as limiting the spirit of the present invention to an arbitrary specified physical construction.

Figure 1:
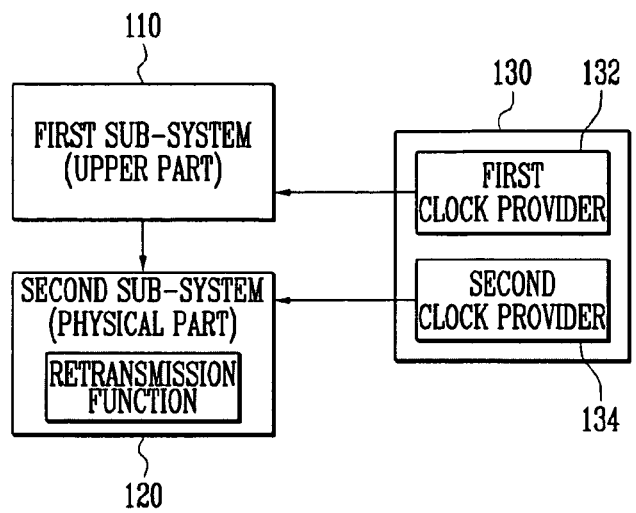

FIG. 1 is a block diagram of a wireless packet communication system, which an apparatus for providing dual variable clocks in accordance with the present invention may be applied to. As shown in FIG. 1, the wireless packet communication system includes a first sub-system 110 for performing operations related to an upper layer (e.g., media access control (MAC) layer), which is above a physical layer; a second sub-system 120 for performing operations related to the physical layer having a retransmission function; and an apparatus 130 for providing variable clocks (hereinafter, referred to as "variable clock provider") optimized for the first and second sub-systems, respectively.

The first sub-system 110 may operate based on a clock optimized for an actual data transmission rate provided by a first clock provider 132, and the second sub-system 120 may operate based on a clock optimized for a transfer mode provided by a second clock provider 134.

The retransmission operation of the second sub-system 120 is performed when an acknowledgement (ACK) message, which reports that a previously-transmitted packet is normally received, is not received from the other communication device within a designated time, or when a negative acknowledgement (NAK) message is received, which notifies that the other communication device could not receive the packet. A receiver-side communication device may perform the processes of parsing a header of a received MAC packet, verifying integrity of the MAC packet header, and verifying completeness of data (by performing CRC (Cyclic Redundancy Check)). And, when any one of these processes fails, the receiver-side communication device sends the NAK packet reporting reception failure to a transmitter-side communication device.

The variable clock provider 130 is connected to the first and second sub-systems 110 and 120. The variable clock provider 130 provides a first clock optimized for the actual transmission rate to the first sub-system 110 where the calculation ability needed for communication is dependent upon the actual transmission rate, and a second clock optimized for the transfer mode to the second sub-system 120 where the calculation ability needed for communication is dependent upon the transfer mode.

Figure 2:
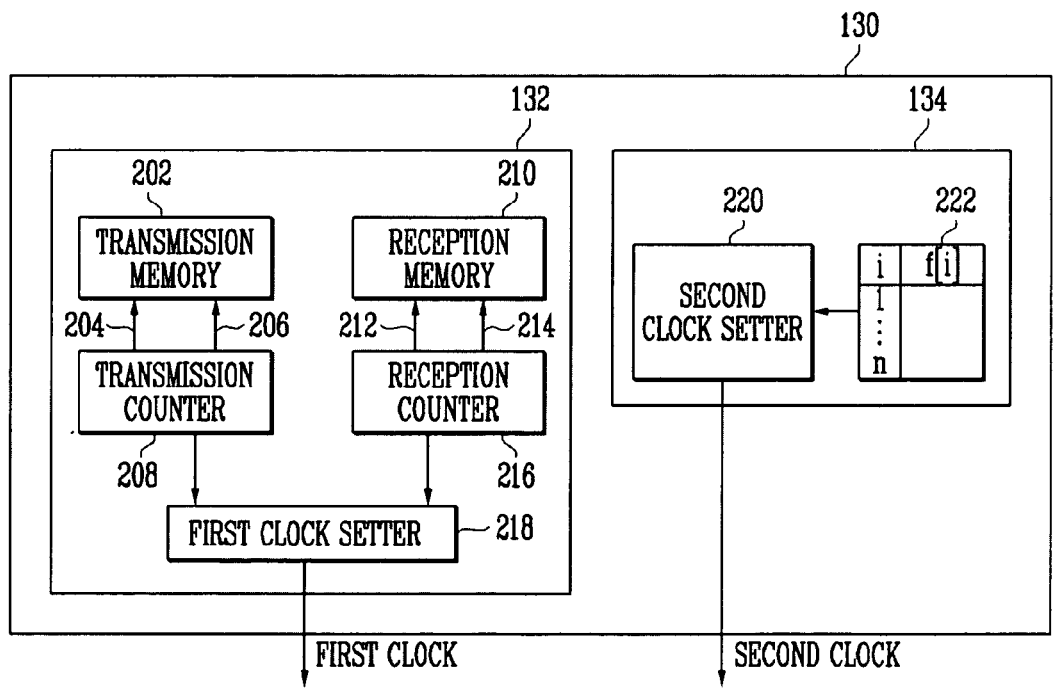
FIG. 2 is a block diagram showing a detailed structure of an apparatus for providing dual variable clocks according to an exemplary embodiment of the present invention.

FIG. 2 is a block diagram showing a detailed structure of a variable clock provider 130 according to an exemplary embodiment of the present invention. As shown, the variable clock provider 130 includes a first clock provider 132 for calculating the actual transmission and reception rates of a packet by a certain period and providing an optimal first clock frequency based on the calculated actual transmission and reception rates to the first sub-system 110, and a second clock provider 134 for providing an optimal second clock determined experimentally based on the transfer mode to the second sub-system 120.

In more detail, the first clock provider 132 includes a transmission memory 202 for storing data to be transmitted by the first sub-system 110, a transmission counter 208 for counting the number of the data read by the second sub-system 120, a reception memory 210 for storing data received by the second sub-system 120, a reception counter 216 for counting the number of the data processed by the first sub-system 110 and a first clock setter 218 for setting up a first clock using the values of the transmission and reception counters 208 and 210.

Here, start and end points of the data stored in the transmission memory 202 are indicated by transmission data start and last pointers, T_start_pointer 204 and T_last_pointer 206, respectively. And, start and end points of the data stored in the reception memory 210 are indicated by reception data start and last pointers, R_start_pointer 212 and R_last_pointer 214, respectively.

Here, T_last_pointer 206 is managed by the first sub-system 110, and T_start_pointer 204 is managed by the second sub-system 120. In other words, when data to be transmitted is stored in the transmission memory 202 by the first sub-system 110, T_last_pointer 206 indicates a block position where the last data is stored. When they are read by the second sub-system 120 for the actual data transmission, T_start_pointer 204 moves by the number of read data blocks and the transmission counter 208 increases by the number of read data.

Here, when T_last_pointer 206 exceeds T_start_pointer 204, it means that the first sub-system 110 continues to record data in the transmission memory, while the transmission is delayed in the second sub-system 120. In this case, it is defined in each communication standard whether to discard the existing data or continue to send the existing data. If the standard is adapted to discard the existing data, in order to send new data, T_start_pointer 204 must be displaced by number of the data to be discarded, when T_last_pointer 206 exceeds T_start_pointer 204.

In the meantime, unlike the transmission, R_start_pointer 212 of the reception memory 210 is managed by the first sub-system 110, and R_last_pointer 214 is managed by the second sub-system 120. When received data are stored in the reception memory in the second sub-system 120, R_last_pointer 214 indicates a position where the last data is stored. Whenever the received data are processed by the first sub-system 110, R_start_pointer 212 moves by the number of the processed data and the reception counter 216 increases by the number of processed data.

Here, the fact that R_last_pointer 214 exceeds R_start_pointer 212 means that the first sub-system 110 processes the data in the system at a slower than the expected rate. This phenomenon is assumed not to occur in the system of the present invention. When the data reception rate in the second sub-system 120 is faster than a data processing rate in the first sub-system 110, the corresponding data become lost. As such, the second sub-system 120 sends a NAK packet to the other party.

The first clock setter 218 operating with a period T reads the values of the transmission and reception counters 208 and 216 at an i-th period (after reading, the transmission and reception counters are each reset to 0(null)), and then the actual transmission and reception rates of the i-th period are calculated according to the following Equations 1 and 2.

$$R_t[i] = \frac{C_t[i] \times L_p}{T} \quad \text{Equation 1}$$

where $R_t[i]$ is the actual transmission rate at the i-th period, $C_t[i]$ is the value of the transmission counter at the i-th period, T is the period, and $L_p$ is the minimum length of a unit of transmitted data.

$$R_r[i] = \frac{C_r[i] \times L_p}{T} \quad \text{Equation 2}$$

where $R_r[i]$ is the actual reception rate at the i-th period, $C_r[i]$ is the value of the reception counter at the i-th period, T is the period, and $L_p$ is the minimum length of a unit of received data.

The first clock setter 218 sets up a first clock frequency F[i+1] optimal for an i+1-th period using the actual transmission and reception rates calculated at the i-th period according to the following Equation 3.

$$F_1[i+1] = (A_t \cdot X \cdot R_t[i] + B_t) + (A_r \cdot X \cdot R_r[i] + B_r), i=0,1,2, \quad \text{Equation 3}$$

Here, values of $A_t$, $B_t$, $A_r$, and $B_r$ are constant. The values of $A_t$ and $B_t$ can be obtained by establishing an environment of artificially receiving only an ACK packet and performing only transmission at the transmission rate $R_t$, and measuring and linearly fitting a first clock needed for the transmission environment with respect to the various transmission rates $R_t$. Similarly, the values of $A_r$ and $B_r$ can be obtained by establishing an environment of artificially receiving only an ACK packet and performing only reception at the reception rate $R_r$ (or transmission on a transmission side at $R_r$), and measuring and linearly fitting a first clock needed for the reception environment with respect to the various reception rates $R_r$.

Here, when the period T is too short, additional power loss increases for calculation of the clock $F_1[i+1]$. When the period T is too long, optimization is delayed so that it is difficult to reduce the power loss. Typically, assuming that a scheduling period of a real-time operating system of a computer is about 10 ms, the period T is appropriately in the range of 10 to 100 ms.

Meanwhile, a second clock setter 220 sets up a value of a second clock based on a mapping table 222 storing optimal clock values $F_2[i]$, i=1, 2, . . . , n according to each transfer mode. The mapping table 222 stores the optimal clock values that have been experimentally determined according to each possible transfer mode of the communication device. In other words, when the number of possible transfer modes of the system is n, the second clock frequencies $F_2[i]$ optimal for the respective indices i=1, 2, . . . , n are stored.

There are various algorithms determining the transfer mode of the communication device and one example will now be described. In order to determine the optimal transfer mode of the second sub-system 120, the following algorithm is performed at every period T. If a current transfer mode is the highest and the actual transmission rate is higher than that of an inferior level of transfer mode, the current transfer mode is maintained. If not, an UpStayDown process is performed. In the UpStayDown process, when the ratio of a former actual transmission rate to a current actual transmission rate is less than 0.9, a future transfer mode will be set downward. When the ratio is greater than 1.1, the transfer mode will be set upward by one level. Otherwise, the current mode is maintained.

In other words, when the current transfer mode is modified faster than the former mode, a future transfer mode is adjusted upward; and when the current transfer mode is modified slower than the former mode, the future transfer mode is adjusted downward According to the present invention, in the wireless communication system with transmission and retransmission functions using multiple transfer modes such as Bluetooth (IEEE 802.15.1), WLAN (IEEE 802.11a/b/g) and WiMAX (IEEE 802.16d/e), the system is logically divided into first and second sub-systems and driving clocks for the sub-systems are adjusted dynamically and independently. Therefore, it is possible to accomplish low-power driving of the first and second sub-systems. In addition, when hardware and software overhead is not taken into account, power consumption can theoretically be reduced up to $(13/18)^2$ compared to conventional art.

While the invention has been shown and described with reference to certain exemplary embodiments thereof, it will be understood by those skilled in the art that various changes in form and details may be made therein without departing from the spirit and scope of the invention as defined by the appended claims.

For example, each component concretely provided in the embodiments of the present invention described above may be modified. And, differences resulting from such modification fall within the scope of the present invention defined by the appended claims.

What is claimed is:

1. A method for providing dual variable clocks in a wireless packet communication system, in which the wireless packet communication system is logically divided into a lower part for performing the function of a physical layer and an upper part for performing the function of a layer above the physical layer, the method comprising the steps of:

(a) measuring actual data transmission and reception rates at a predetermined period, setting up a frequency ($F_1$) of a first clock based on the measured rates, and providing the first clock to the upper part; and (b) determining a transfer mode of the wireless packet communication system, detecting a frequency ($F_2$) of a second clock selected according to the determined transfer mode, and providing the second clock to the lower part, wherein said step (a) includes calculating the actual data transmission and reception rates at the predetermined period based on equations:

$$R_t[i] = \frac{C_t[i] \times L_p}{T}, \text{ and } R_r[i] = \frac{C_r[i] \times L_p}{T}$$

where $R_t[i]$ and $R_r[i]$ are the actual transmission and reception rates at the i-th period, $C_t[i]$ is the number of transmitted data read by the lower part at the i-th period, $C_r[i]$ is the number of received data processed by the upper part at an i-th period, T is the period, and $L_p$ is the minimum length of a unit of the transmitted or received data.

2. The method according to claim 1, wherein said step (a) includes setting up the first clock frequency ($F_1$) based on equation:

$$F_1[i+1] = (A_t \times R_t[i] + B_t) + (A_r \times R_r[i] + B_r)$$

where $F_1[i+1]$ is the first clock frequency at an i+1-th period, $R_t[i]$ is the actual transmission rate at the i-th period, $R_r[i]$ is the actual reception rate at the i-th period, and At, Bt, Ar and Br are constants.

3. The method according to claim 2, wherein the values of $A_t$ and $B_t$ are obtained by measuring and linearly fitting a first clock with respect to the various transmission rates ($R_t$) in a transmission environment.

4. The method according to claim 2, wherein the values of $A_r$ and $B_r$ are obtained by measuring and linearly fitting a first clock frequency with respect to the various reception rates ($R_r$) in a reception environment.

5. The method according to claim 1, wherein the predetermined period ranges from 10 to 100 ms.

6. The method according to claim 1, wherein said step (b) includes determining the transfer mode of the wireless packet communication system through parsing a header of a received packet.

7. The method according to claim 1, wherein said step (b) includes detecting the second clock frequency according to the transfer mode based on a mapping table which stores clock frequencies optimized for each selected transfer mode of the wireless packet communication system.

8. The method according to claim 1, wherein a packet retransmission operation is performed by the lower part based on the second clock.

9. The method according to claim 8, wherein the packet retransmission operation is performed when an acknowledgement (ACK) message reporting normal receipt of a previously transmitted packet is not received from the other communication device within a predetermined time, or when a negative acknowledgement (NAK) message reporting failure to receive the previously transmitted packet is received from the other communication device.

10. An apparatus for providing dual variable clocks in a wireless packet communication system, in which the wireless packet communication system is logically divided into a lower part for performing the function of a physical layer and an upper part for performing the function of an upper layer above the physical layer, the apparatus comprising:

a first clock providing means for measuring actual data transmission and reception rates at a predetermined period, setting up a frequency ($F_1$) of a first clock based on the measured rates, and providing the first clock to the upper part; and a second clock providing means for determining a transfer mode of the wireless packet communication system, detecting a frequency ($F_2$) of a second clock selected according to the determined transfer mode, and providing the second clock to the lower part, wherein said first clock providing means for calculating the actual data transmission and reception rates at the predetermined period based on equations:

$$R_t[i] = \frac{C_t[i] \times L_p}{T}, \text{ and } R_r[i] = \frac{C_r[i] \times L_p}{T}$$

where $R_t[i]$ and $R_r[i]$ are the actual transmission and reception rates at the i-th period, $C_t[i]$ is the number of transmitted data read by the lower part at the i-th period, $C_r[i]$ is the number of received data processed by the upper part at an i-th period, T is the period, and $L_p$ is the minimum length of a unit of the transmitted or received data.

* * * * *